United States Patent
Garbarino et al.

(10) Patent No.: US 9,829,319 B2
(45) Date of Patent: Nov. 28, 2017

(54) MICROELECTROMECHANICAL DEVICE HAVING AN OSCILLATING MASS AND A FORCING STAGE, AND METHOD OF CONTROLLING A MICROELECTROMECHANICAL DEVICE

(71) Applicant: STMicroelectronics S.R.L., Agrate Brianza (IT)

(72) Inventors: Marco Garbarino, Bareggio (IT); Andrea Donadel, Meda (IT); Davide Magnoni, Varese (IT); Carlo Valzasina, Gessate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/985,071

(22) Filed: Dec. 30, 2015

(65) Prior Publication Data
US 2016/0109237 A1    Apr. 21, 2016

Related U.S. Application Data

(62) Division of application No. 13/799,243, filed on Mar. 13, 2013, now Pat. No. 9,448,071.

(51) Int. Cl.
G01C 19/56     (2012.01)
G01C 19/5762   (2012.01)
G01C 19/5726   (2012.01)

(52) U.S. Cl.
CPC ..... *G01C 19/5762* (2013.01); *G01C 19/5726* (2013.01)

(58) Field of Classification Search
None
See application file for complete search history.

(56) References Cited

U.S. PATENT DOCUMENTS

| | | |
|---|---|---|
| 5,908,986 A | 6/1999 | Mitamura |
| 6,766,689 B2 | 7/2004 | Spinola Durante et al. |
| 6,928,872 B2 | 8/2005 | Durante et al. |
| 7,481,111 B2 * | 1/2009 | Caminada .......... G01C 19/5726 73/503.3 |
| 7,694,563 B2 | 4/2010 | Durante et al. |
| 2006/0277995 A1 * | 12/2006 | Kutsuna ................. G01C 19/56 73/504.02 |
| 2009/0235742 A1 | 9/2009 | Matsumoto et al. |

* cited by examiner

*Primary Examiner* — Paul West
*Assistant Examiner* — Mark A Shabman
(74) *Attorney, Agent, or Firm* — Seed IP Law Group LLP

(57) ABSTRACT

A microelectromechanical device includes: a body; a movable mass, elastically coupled to the body and oscillatable with respect to the body according to a degree of freedom; a frequency detector, configured to detect a current oscillation frequency of the movable mass; and a forcing stage, capacitively coupled to the movable mass and configured to provide energy to the movable mass through forcing signals having a forcing frequency equal to the current oscillation frequency detected by the frequency detector, at least in a first transient operating condition.

19 Claims, 4 Drawing Sheets

MICROELECTROMECHANICAL DEVICE HAVING AN OSCILLATING MASS AND A FORCING STAGE, AND METHOD OF CONTROLLING A MICROELECTROMECHANICAL DEVICE

BACKGROUND

Technical Field

The present disclosure relates to a microelectromechanical device having an oscillating mass and a forcing stage and a method for controlling a microelectromechanical device.

Description of the Related Art

As is known, the use of microelectromechanical systems (MEMS) has increasingly spread in various technological sectors and has yielded encouraging results especially in providing inertial sensors, micro-integrated gyroscopes, and electromechanical oscillators for a wide range of applications.

MEMS systems of this type are usually based upon microelectromechanical structures comprising at least one mass connected to a fixed body (stator) by springs and movable with respect to the stator according to one or more degrees of freedom. The movable mass and the stator are capacitively coupled through a plurality of respective comb-fingered and mutually facing electrodes so as to form capacitors. The movement of the movable mass with respect to the stator, for example on account of an external stress, modifies the capacitance of the capacitors. Thus, by sensing capacitance, it is possible to trace back to the relative displacement of the movable mass with respect to the fixed body and hence to the force applied. Instead, by providing appropriate biasing voltages, it is possible to apply an electrostatic force to the movable mass to set it in motion. In addition, for providing electromechanical oscillators the frequency response of MEMS inertial structures is exploited, which is typically of a second-order low-pass type with one resonance frequency.

MEMS gyroscopes have a more complex electromechanical structure, which comprises two masses that are movable with respect to the stator and are coupled to one another so as to have a relative degree of freedom. The two movable masses are both capacitively coupled to the stator. One of the masses is dedicated to a driving sub-system and is kept in oscillation at the resonance frequency. The other mass is drawn in the (translational or rotational) oscillatory motion and, in the event of rotation of the microstructure with respect to a gyroscopic sensing axis with an angular velocity, is subject to a Coriolis force proportional to the angular velocity itself. In practice, the driven mass, which is capacitively coupled to the fixed body through electrodes, as likewise the driving mass, operates as an accelerometer, which enables detection of the Coriolis force and acceleration and hence makes it possible to trace back to the angular velocity.

In gyroscopes, as likewise in other devices, the movable mass or the system of movable masses is maintained in oscillation at a controlled frequency. This may be accomplished through a driving device coupled to the micromechanical structure so as to form a resonant microelectromechanical loop which vibrates with controlled frequency and amplitude. Clearly, upon turning-on of the device (power-on) or at exit from low-consumption configurations (power-down) a start-up transient occurs before the movable mass or the system of movable masses reaches a stable condition of oscillation.

In the start-up transient, the oscillatory motion is forced through start-up components, which supply a fixed amount of energy, normally by applying one or more sequences of pulses of programmed duration to the movable mass. Once the transient is exhausted, the start-up components are de-activated, and the oscillation is maintained by the microelectromechanical loop that guarantee normal operation.

Sequences of pulses may be generated during start-up transients by a local oscillator embedded in an ASIC ("Application Specific Integrated Circuit") chip coupled to the micromechanical structure. The overall number of pulses (i.e. the maximum duration of the forcing sequence of pulses) is determined from the residual difference between the oscillation frequency of the oscillator and the microelectromechanical loop. The residual frequency difference, in fact, causes a phase lag at each oscillation cycle between the oscillator output and the natural resonance frequency of the microelectromechanical loop. The overall phase delay therefore increases in time as the number of pulses increases and may lead to a condition in which energy provided by the local oscillator tends to counter rather than favoring oscillation of the microelectromechanical loop. In particular, the overall phase delay cannot exceed $\pi/2$ for an efficient forcing.

BRIEF SUMMARY

In order to avoid this condition, energy supply by the local oscillator is stopped after a programmed maximum number of pulses. Thus, start-up transients may be quite long, while it would be desirable to keep them as short as possible.

According to an aspect of the present disclosure there is provided a microelectromechanical device comprising:

a body;

a movable mass, elastically coupled to the body and oscillatable with respect to the body according to a degree of freedom;

a frequency detector, configured to detect a current oscillation frequency of the movable mass; and a forcing stage, capacitively coupled to the movable mass and configured to provide energy to the movable mass through forcing signals having a forcing frequency equal to the current oscillation frequency detected by the frequency detector, at least in a first transient operating condition.

According to another aspect of the present disclosure there is provided an electronic system having a microelectromechanical device and a control unit coupled to the microelectromechanical device;

the microelectromechanical device comprising:

a body;

a movable mass, elastically coupled to the body and oscillatable with respect to the body according to a degree of freedom;

a frequency detector, configured to detect a current oscillation frequency of the movable mass; and a forcing stage, capacitively coupled to the movable mass and configured to provide energy to the movable mass through forcing signals having a forcing frequency equal to the current oscillation frequency detected by the frequency detector, at least in a first transient operating condition.

According to another aspect of the present disclosure there is provided a method of controlling a microelectromechanical device, comprising:

oscillating a movable mass with respect to a body according to a degree of freedom;

detecting a current oscillation frequency of the movable mass; and providing energy to the movable mass through forcing signals having a forcing frequency equal to the detected current oscillation frequency, at least in a first transient operating condition.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
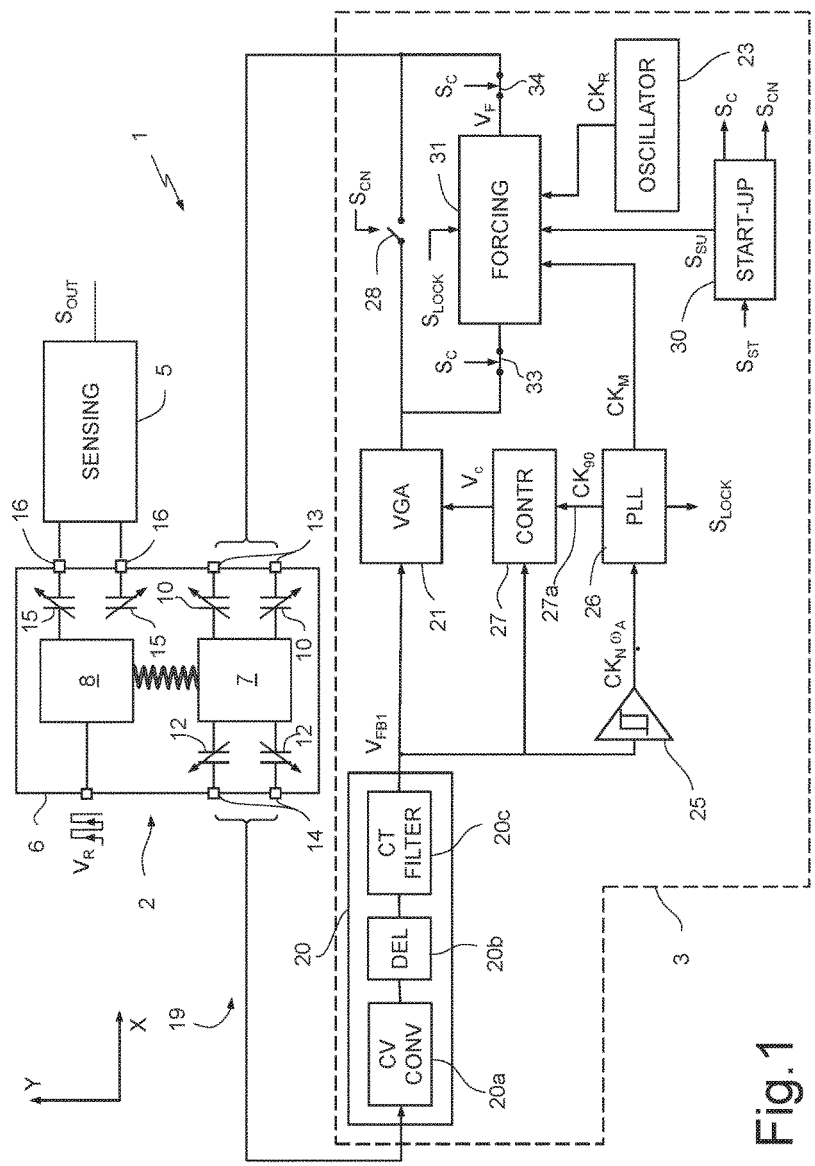
FIG. 1 is a simplified block diagram of a microelectromechanical device in accordance with an embodiment of the present disclosure.

FIG. 1 schematically illustrates a microelectromechanical gyroscope 1 in accordance with an embodiment of the present disclosure. What is hereinafter disclosed, however, is also applicable to different oscillating microelectromechanical devices, such as an electromechanical oscillator for use in telecommunications or an inertial sensor with force-feedback reading.

The gyroscope 1 comprises a microstructure 2, made of semiconductor material, a driving device 3, and a sensing device 5.

The microstructure 2 is made of semiconductor material and comprises a supporting body 6, a driving mass 7, and at least one sensing mass 8. For the sake of simplicity, in the embodiment illustrated herein reference will be made to the case of a uniaxial gyroscope, in which a single sensing mass 8 is present. The following description applies, however, also in the case of multiaxial gyroscopes, which comprise two or more sensing masses for detecting rotations according to respective independent axes.

The driving mass 7 is elastically connected through springs (not shown) to the supporting body 6 so as to be oscillatable about a resting position in accordance with a translational or rotational degree of freedom.

The sensing mass 8 is mechanically coupled to the driving mass 7 so as to be driven in motion according to the degree of freedom of the driving mass 7 itself. In addition, the sensing mass 8 is elastically connected to the driving mass 7 so as to be oscillatable in turn with respect to the driving mass 7 itself, with a respective further translational or rotational degree of freedom. In particular, in the embodiment described herein, the driving mass 7 is linearly movable along a driving axis X, whereas the sensing mass 8 is movable with respect to the driving mass 7 according to a sensing axis Y perpendicular to the driving axis X. It is understood, however, that the type of movement (translational or rotational) allowed by the degrees of freedom and the arrangement of the driving and sensing axes may vary according to the type of gyroscope. In addition, with reference to the movements of the driving mass 7 and of the sensing mass 8, the expressions "according to an axis" and "in accordance with an axis" will be used to indicate movements along an axis or about an axis, according to whether the movements allowed to the masses by the respective degrees of freedom are translational or else rotational, respectively. In a similar way, the expressions "according to a degree of freedom" and "in accordance with a degree of freedom" will be used to indicate translational or rotational movements, as allowed by the degree of freedom itself.

The driving mass 7 (with the sensing mass 8) is connected to the supporting body 6 so as to define a resonant mechanical system with one resonance frequency (according to the driving axis X).

As illustrated schematically in FIG. 1, the driving mass 7 is capacitively coupled to the supporting body 6 by capacitive driving units 10 and capacitive feedback sensing units 12. The capacitive coupling is of a differential type and is determined by the relative position of the driving mass 7 with respect to the supporting body 6. In particular, the capacitive driving units 10 and the capacitive feedback sensing units 12 are accessible from outside the microstructure 2 through driving terminals 13 and feedback sensing terminals 14, respectively.

The sensing mass 8 is capacitively coupled to the supporting body 6 by capacitive signal sensing units 15, accessible from outside by signal sensing terminals 16. Also in this case, the capacitive coupling is of a differential type and is determined by the relative position of the sensing mass 8 with respect to the supporting body 6.

By way of example, but not necessarily, the microstructure 2 may be obtained as described in U.S. Pat. No. 6,928,872 for a uniaxial gyroscope, which is incorporated by reference herein in its entirety. The microstructure of a multiaxial gyroscope could be obtained, for example, as described in detail in U.S. Pat. No. 7,694,563, which is incorporated by reference herein in its entirety.

The driving device 3 is connected to the driving terminals 13 and to the feedback sensing terminals 14 of the microstructure 2 so as to form, with the driving mass 7, a microelectromechanical loop 19. The driving device 3 is configured to maintain the microelectromechanical loop 19 in oscillation at a driving frequency $\omega_D$ close to the resonance frequency of the mechanical system defined by the driving mass 7 (with the sensing mass 8) connected to the supporting body 6.

The sensing device 5 is connected to the sensing terminals 16 and converts signals indicating the displacement of the sensing mass 8 into an output signal $S_{OUT}$ indicating the angular speed of the microstructure 2.

In greater detail, the driving device 3 comprises a reading and filtering stage 20, a variable-gain amplifier 21, an oscillator 23, a comparator 25, a phase-locked-loop (PLL) circuit 26, a controller 27, a start-up stage 30, and a forcing stage 31.

The reading and filtering stage 20 is connected to the feedback sensing terminals 14 of the microstructure 2 and in one embodiment comprises a C-V converter 20a, such as a charge amplifier, a delay module 20b and a continuous-time filter 20c. The C-V converter 20a may be a discrete-time fully-differential charge amplifier, which has inputs coupled to the capacitive feedback sensing units 12 and is configured to sense capacitance thereof. The delay module 20b introduces a controlled phase delay in the microelectromechanical loop 19 in order to achieve an oscillation condition for the phase (i.e. the phase of the microelectromechanical loop 19 at the driving frequency $\omega_D$ is $2k\pi$). The continuous-time filter 20c is an analog filter that converts discrete-time signals from the delay module 20b into corresponding continuous-time signals.

The reading and filtering stage 20 supplies a (continuous-time) first feedback signal $V_{FB1}$, indicating the conditions of oscillation of the driving mass 7. In particular, the first feedback signal $V_{FB1}$ indicates the velocity of the driving mass 7. In a different embodiment, the first feedback signal $V_{FB1}$ indicates the position of the driving mass 7. In addition, the reading and filtering stage 20 controls the phase of the first feedback signal $V_{FB1}$ so as to guarantee the condition of oscillation on the phase for the microelectromechanical loop 19.

The variable-gain amplifier 21 is coupled to the reading and filtering stage 20 for receiving the first feedback signal $V_{FB1}$ and is selectively connectable to the feedback driving terminal 13 of the microstructure 2 through bypass switches 28 (in effect, two connection lines and a bypass switch 28 for each of the connection lines are present between the variable-gain amplifier 21 and the feedback driving terminal 13; for reasons of simplicity, FIG. 1 represents a multiple line with just one switch).

The oscillator 23 is connected to the start-up stage 30 for supplying a reference clock signal $CK_R$ at a reference frequency $\omega_R$ that is constant and independent of the frequency of oscillation of the driving mass 7. In particular, the reference clock signal $CK_R$ is selected so that the reference frequency $\omega_R$ is near to the driving frequency $\omega_D$.

The comparator 25 is coupled to the reading and filtering stage 20 for receiving the first feedback signal $V_{FB1}$ and is configured to detect the instants of zero crossing of the input. In practice, the output of the comparator 25, which is connected to the PLL circuit 26 and to the start-up stage 30, supplies a natural clock signal $CK_N$, which, in steady-state conditions, is synchronous (in frequency and phase) with the oscillations of the driving mass 7.

The PLL circuit 26 receives the natural clock signal $CK_N$ from the comparator 25. An output of the PLL circuit 26 is connected to a clock input 27a of the controller 27 and supplies a main clock signal $CK_M$ and a delayed clock signal $CK_{90}$, respectively in phase and phase-shifted by 90° with respect to the natural clock signal $CK_N$. In practice, the PLL circuit 26 has the function of a frequency detector that senses the current oscillation conditions (frequency and phase) of the driving mass 7 and of the microelectromechanical loop 19. The delayed clock signal $CK_{90}$ switches in the presence of the peaks of the first feedback signal $V_{FB1}$. The PLL circuit 26 further supplies a lock signal $S_{LOCK}$, having a first logic value when the PLL circuit 26 is locked to the oscillation frequency of the microelectromechanical loop 19 and a second logic value otherwise.

The controller 27, for example a P (Proportional), PI (Proportional-Integral) or PID (Proportional-Integral-Derivative) controller, receives the first feedback signal $V_{FB1}$ and the delayed clock signal $CK_{90}$ and controls the gain of the variable-gain amplifier 21 through a control signal $V_C$ so as to guarantee the condition of oscillation on the amplitude for the microelectromechanical loop 19.

The start-up stage 30 is selectively activatable in response to active values of one or more state signals $S_{ST}$, which may indicate normal or steady operating conditions, power-on conditions or conditions of exit from power-down. State signals $S_{ST}$ may be automatically generated by a control unit, herein not illustrated. When activated, the start-up stage 30 controls the forcing stage 31 through a start-up signal $S_{SU}$, as described hereinafter.

The forcing stage 31 is connectable between the output of the variable-gain amplifier 21 and the driving terminals 13 of the microstructure 2 through start-up switches 33, 34, controlled through an actuation signal $S_C$, supplied by the start-up stage 30. The bypass switches 28 (controlled by the negated actuation signal $S_{CN}$) enable connection of the output of the variable-gain amplifier 21 directly to the driving terminals 13, excluding the forcing stage 31.

The forcing stage 31 is controlled by the start-up stage 30 through the start-up signal $S_{SU}$. In particular, the forcing stage 31 is configured to apply forcing signals $V_F$ (voltages in one embodiment) to the driving mass 7, in response to the start-up signal $S_{SU}$.

Here and in what follows, "forcing signals" is generally used to mean sinusoidal signals or sequences of pulses, such as, but not limited to, square-wave pulses, that and are applied to the driving mass 7 for producing an electrostatic force thereon. A forcing frequency $\omega_F$ of the forcing signals $V_F$ is determined by the forcing stage 31 on the basis of the state of the PLL circuit 26 during start-up procedure. Before the PLL circuit 26 locks to the oscillation frequency of the microelectromechanical loop 19 (lock signal $S_{LOCK}$ at the second logic value), the forcing frequency $\omega_F$ of the forcing signals $V_F$ supplied by the forcing stage 31 equals the reference frequency $\omega_R$ of the reference clock signal $CK_R$. Moreover, a maximum number of cycles of the forcing signals $V_F$ is selected so that the phase delay does not counter oscillations of the microelectromechanical loop 19. In one embodiment, the maximum number of cycles is selected so that the overall phase delay of the forcing signals $V_F$ with respect to oscillations of the microelectromechanical loop 19 does not exceed $\pi/2$.

Once the PLL circuit 26 has locked to the oscillation frequency of the microelectromechanical loop 19 (that is, the lock signal $S_{LOCK}$ has the first logic value and the main clock signal $CK_M$ is in phase with oscillations of the microelectromechanical loop 19), the forcing signals $V_F$ provided by the forcing circuit 31 are synchronized in frequency and phase with the oscillations of the microelectromechanical loop 19, through the main clock signal $CK_M$. Hence the forcing frequency $\omega_F$ equals the current oscillation frequency $\omega_C$ of the microelectromechanical loop 19.

The gyroscope 1 operates as hereinafter described.

In a normal or steady operating mode, the reading and filtering stage 20 and the variable-gain amplifier 21 maintain the microelectromechanical loop 19 in oscillation at the driving frequency $\omega_D$ by setting appropriate gain and phase conditions, while the forcing stage 31 is excluded and inactive. Oscillation conditions may include unitary loop gain and loop phase of $2k\pi$ (k=0, 1, 2, . . . ) at the driving frequency $\omega_D$.

In the case of rotation about a gyroscopic sensing axis, the sensing mass 8 is subjected to a Coriolis acceleration, which is proportional to the angular rate and is transduced into the output signal $S_{out}$ by the sensing device 5.

At start-up of the gyroscope 1 or at exit from power-down conditions, a start-up procedure is executed by activating the start-up stage 30 and the forcing stage 31 through the state signals $S_{ST}$. At the same time, the start-up switches 33, 34 and the bypass switch 28 are operated to connect the forcing stage 31 to the capacitive driving units 10 in place of the variable-gain amplifier 21.

The start-up stage 30, through the start-up signal $S_{SU}$, requests the forcing stage 31 to send forcing signals $V_F$ to the driving mass 7, which starts to oscillate with an increasing amplitude.

Figure 2:
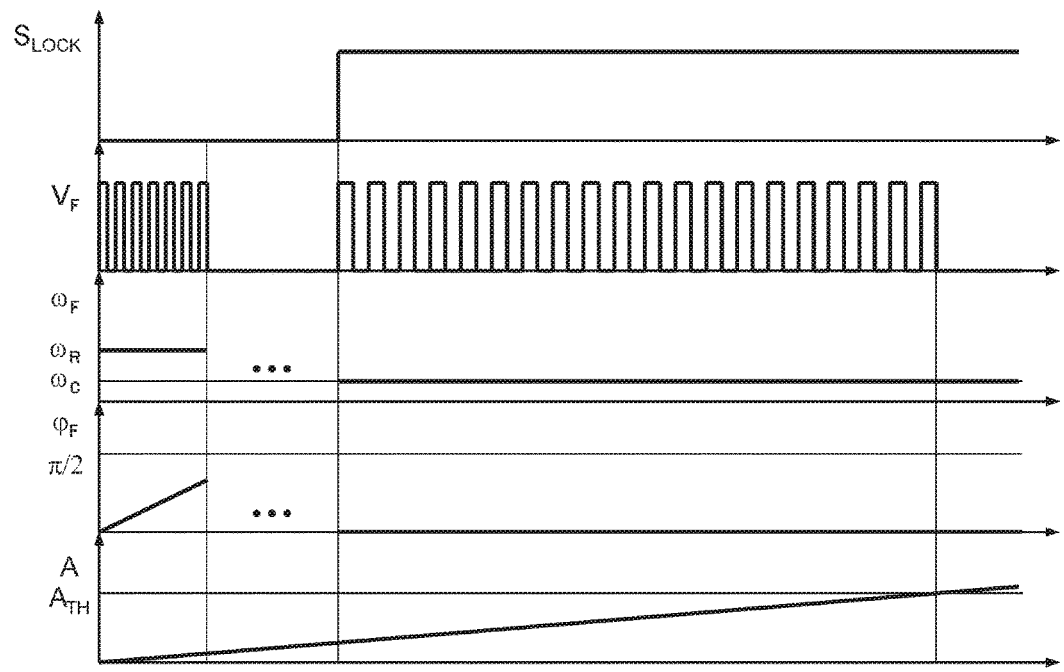
FIG. 2 is a graph showing quantities relating to the microelectromechanical device of FIG. 1.

As illustrated in FIG. 2, at an early stage of the start-up procedure, the PLL circuit 26 has not locked to the oscillation of the driving mass 7 yet (or, generally, to the oscillations of the microelectromechanical loop 19; the lock signal $S_{LOCK}$ has the second logic value, which is low in the example of FIG. 2). In this condition, the forcing stage 31 generates the forcing signals $V_F$ at the reference frequency $\omega_R$ of the reference clock signal $CK_R$. As already mentioned, the maximum number of cycles (i.e. the duration) of the forcing signals $V_F$ at the reference frequency $\omega_R$ is selected to prevent that an overall phase delay $\phi_F$ with respect to oscillations of the driving mass 7 may exceed $\pi/2$. The supply of the forcing signals $V_F$ is then paused in presence of the second logic value of the lock signal $S_{LOCK}$ and the start-up switches 33, 34 and the bypass switch 28 are operated to connect variable-gain amplifier 21 to the capacitive driving units 10 and to disconnect the forcing stage 31. At this stage, the oscillation of the microelectromechanical loop 19 is controlled by the variable-gain amplifier 21 and the controller 27 and no forcing signals are provided by the forcing stage 31.

The PLL circuit 26 rapidly locks to the oscillations of the microelectromechanical loop 19 (the lock signal $S_{LOCK}$ has the first logic value, high in the example of FIG. 2). In response to the PLL circuit 26 being locked, the forcing stage 31 sets the frequency of the forcing signals $V_F$ at the frequency of the main clock signal $CK_M$, that is, at the current oscillation frequency $\omega_C$ of the microelectromechanical loop 19. Again, the start-up switches 33, 34 and the bypass switch 28 connect the forcing stage 31 to the capacitive driving units 10 in place of the variable-gain amplifier 21.

Thus, forcing signals $V_F$ may present an increasing phase delay $\phi_F$ with respect to oscillations of the driving mass 7 only for a very short time interval at the beginning of the start-up procedure. In any case, the phase delay $\phi_F$ does not exceed $\pi/2$ because supply of the forcing signals $V_F$ is interrupted after the programmed maximum number of cycles.

Figure 3:
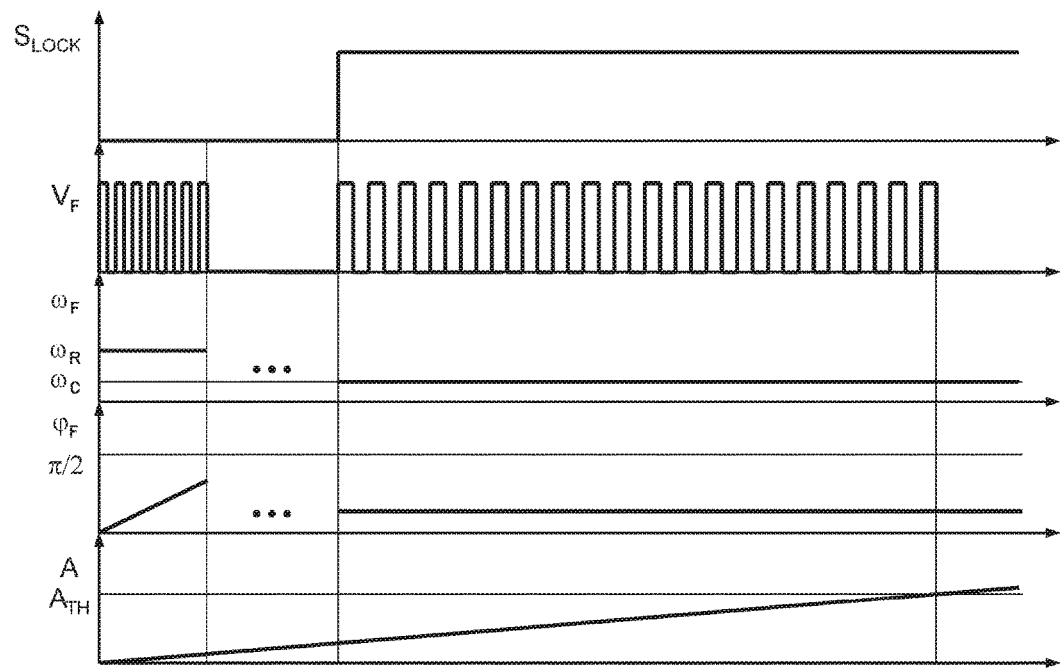
FIG. 3 is a graph showing quantities relating to a microelectromechanical device in accordance with another embodiment of the present disclosure.

Once the PLL circuit 26 has locked, the forcing signals $V_F$ are synchronous in frequency and phase with the oscillations of the microelectromechanical loop 19 and the phase delay $\phi_F$ remains substantially constant. The forcing stage 31 is configured to maintain the phase delay $\phi_F$ below $\pi/2$. In one embodiment (FIG. 2), the forcing stage 31 is configured to cancel the phase delay $\phi_F$ ($\phi_F=0$) using phase information contained in the main clock signal $CK_M$. In another embodiment, the phase delay $\phi_F$ may be not zero, but it is anyway less than $\pi/2$ (FIG. 3).

Since the initial increment of the phase delay $\phi_F$ is arrested as soon as the maximum number of cycles of the forcing signals $V_F$ is reached and the forcing signals $V_F$ are synchronous with the microelectromechanical loop 19 after the PLL circuit 26 locks, a condition in which the forcing signals $V_F$ counter oscillation of the driving mass 7 because of phase mismatch is effectively prevented. Therefore, the supply of forcing signals $V_F$ does not need to be interrupted and may be maintained as long as desired to quickly recover from shut-off or power-down condition. For example, forcing signals $V_F$ may be provided until the oscillation amplitude of the driving mass 7 exceeds an amplitude threshold $A_{TH}$. In turn, the amplitude threshold $A_{TH}$ may be a fraction of a target oscillation amplitude, which is to be maintained during normal or steady operating conditions. The amplitude threshold $A_{TH}$ may be selected to provide a safety margin and avoid elongation over the rated target oscillation amplitude, which may cause collisions with the supporting body 6.

Figure 4:
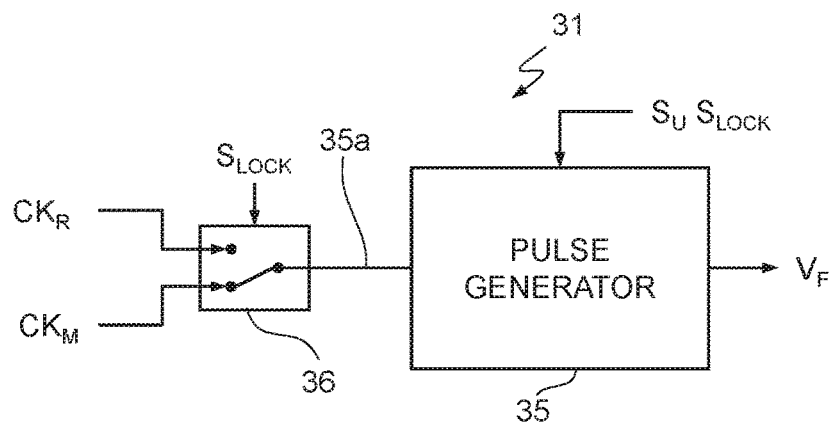
FIG. 4 is a more detailed block diagram of a first component of the microelectromechanical device of FIG. 1.

FIG. 4 shows an exemplary implementation of the forcing stage 31. In one embodiment, the forcing stage 31 comprises a pulse generator 35 and a two-way switch 36. The pulse generator 35 is selectively activatable by the start-up signals $S_{SU}$, when start-up conditions or exit from power-down conditions are detected. Moreover, the pulse generator 35 is configured to provide the forcing signals $V_F$ and its pulse generation frequency is controlled by a clock signal received on a control terminal 35a. In particular, the pulse generator 35 provides appropriate voltage levels to effectively transfer energy to the driving mass 7. The pulse generator 35 may be temporarily de-activated after the selected maximum number of cycles of the forcing signals $V_F$, when the lock signal $S_{LOCK}$ indicates that the PLL circuit 26 is not locked to the oscillations of the microelectromechanical loop 19, and re-activated afterwards.

The two-way switch 36 receives the reference clock signal $CK_R$ and the main clock signal $CK_M$ on its inputs and has an output coupled to the control terminal 35a of the pulse generator 35. The two-way switch 36 is controlled by the lock signal $S_{LOCK}$ and is configured to supply the control terminal 35a with the reference clock signal $CK_R$, when the lock signal $S_{LOCK}$ indicates that the PLL circuit 26 is not locked to the oscillations of the microelectromechanical loop 19, and with the main clock signal $CK_M$, when the lock signal $S_{LOCK}$ indicates that the PLL circuit 26 is locked to the oscillations of the microelectromechanical loop 19.

Figure 5:
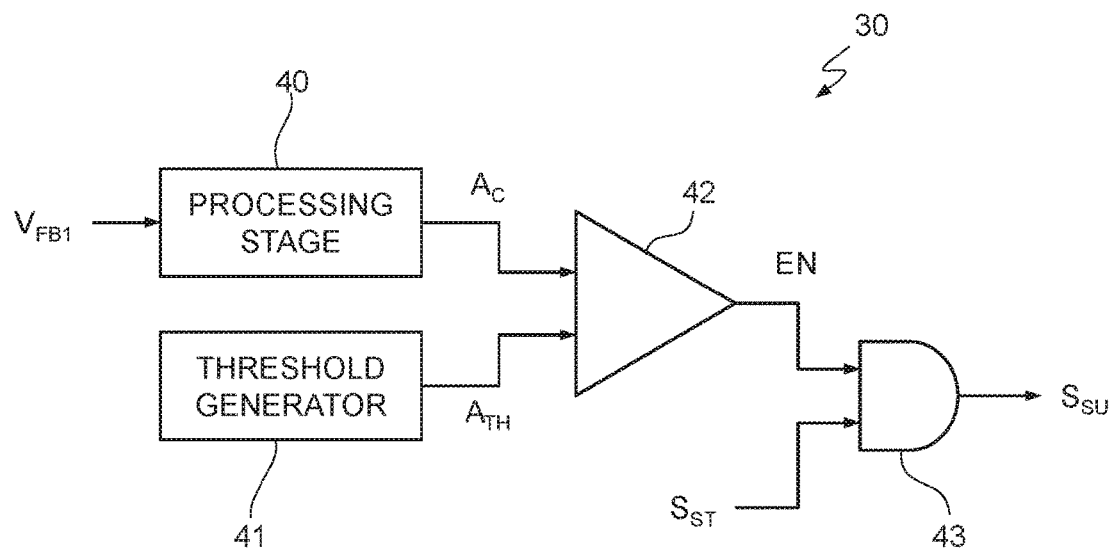
FIG. 5 is a more detailed block diagram of a second component of the microelectromechanical device of FIG. 1.

Conditions to terminate the start-up procedure and the supply of the forcing signals $V_F$ may be determined by the start-up stage 30, which, in one embodiment illustrated in FIG. 5, comprises a processing stage 40, a threshold generator 41, a comparator 42 and an enable logic gate 43 (e.g. an AND gate). The processing stage 40 receives the first feedback signal $V_{FB1}$, which is representative of the oscillation conditions of the driving mass 7, and is configured to determine a current oscillation amplitude $A_C$ of the microelectromechanical loop 19. The comparator 42 determines an enable signal EN from the comparison of the current oscillation amplitude $A_C$ and of the amplitude threshold $A_{TH}$, which is provided by the threshold generator 41. For example, the comparator 42 is configured to set an enable signal EN to an enable value (e.g. high) when the current oscillation amplitude $A_C$ is lower than the amplitude threshold $A_{TH}$, and to a disable value (low) when the current oscillation amplitude $A_C$ reaches or exceeds the amplitude threshold $A_{TH}$. The enable logic gate 43 receives the enable signal EN and the state signals $S_{ST}$ and provide the start-up signal $S_{SU}$ on its output.

Figure 6:
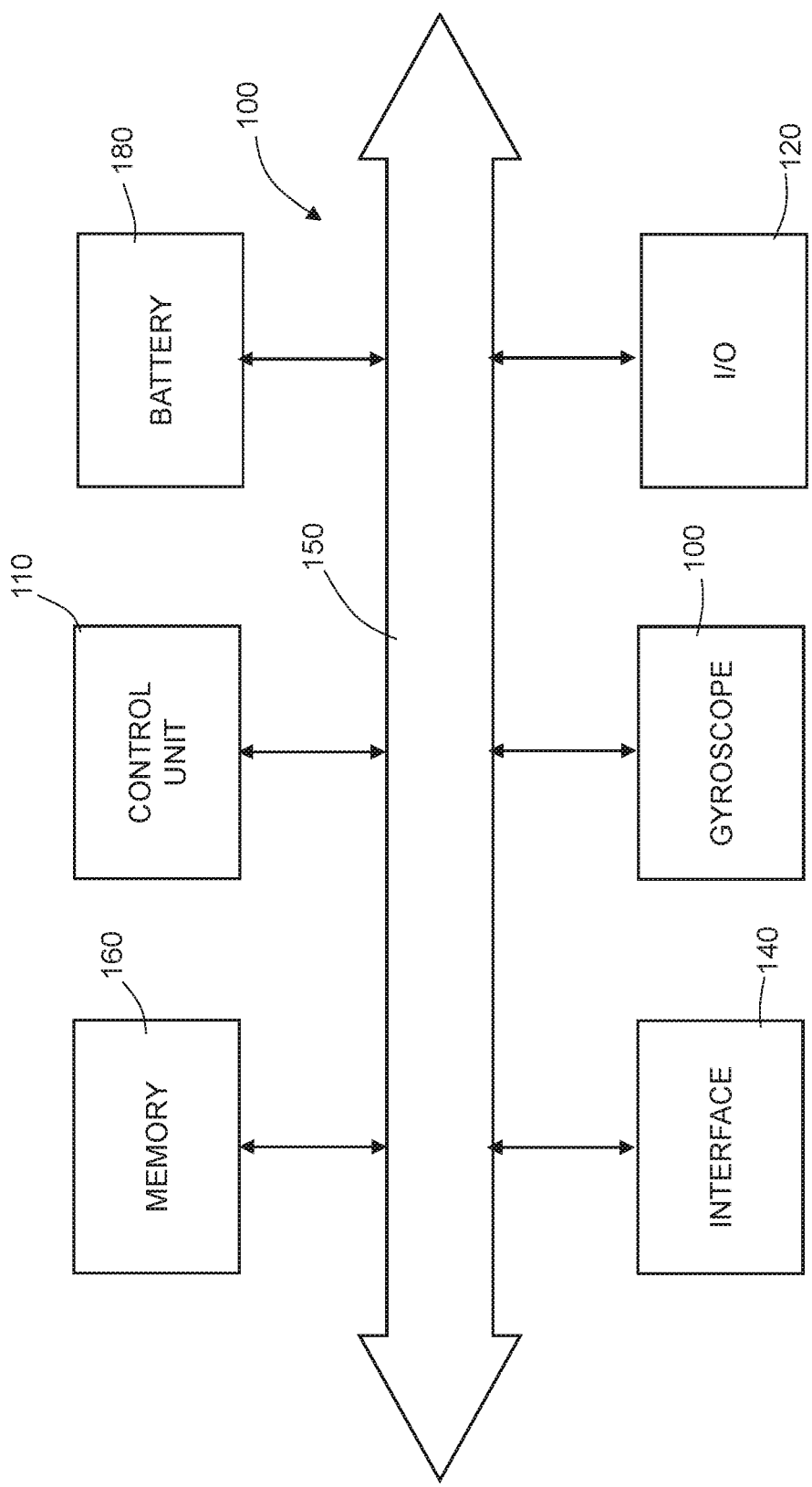
FIG. 6 is a simplified block diagram of an electronic system incorporating a microelectronic device according to one embodiment of the present disclosure.

Illustrated in FIG. 6 is a portion of an electronic system 100 in accordance with one embodiment of the present disclosure. The system 100 incorporates a microelectromechanical device (for example, but not necessarily, the gyroscope 100) and may be used in devices as, for example, a palm-top computer (personal digital assistant, PDA), a laptop or portable computer, possibly with wireless capacity, a cellphone, a messaging device, a digital music player, a digital camera or other devices designed to process, store, transmit, or receive information. For example, the gyroscope 1 may be used in a digital camera for detecting movements and performing an image stabilization. In other embodiments, the gyroscope 1 is included in a portable computer, a PDA, or a cellphone for detecting a free-fall condition and activating a safety configuration. In a further embodiment, the gyroscope 1 is included in a motion-activated user interface for computers or video-game consoles. In a further embodiment, the gyroscope 1 is incorporated in a satellite-navigation device and is used for simultaneous position tracking in the event of loss of the satellite-positioning signal.

The electronic system 100 can comprise a controller 110, an input/output (I/O) device 120 (for example a keyboard or a display), the gyroscope 1, a wireless interface 140, and a memory 160, of a volatile or nonvolatile type, coupled to one another through a bus 150. In one embodiment, a battery 180 may be used for supplying the system 100. It is to be noted that the scope of the present disclosure is not limited to embodiments having necessarily one or all of the devices listed.

The controller 110 can comprise, for example, one or more microprocessors, microcontrollers, and the like.

The I/O device 120 may be used for generating a message. The system 100 can use the wireless interface 140 for transmitting and receiving messages to and from a wireless communications network with a radiofrequency (RF) signal. Examples of wireless interface can comprise an antenna, and a wireless transceiver, such as a dipole antenna, even though the scope of the present disclosure is not limited from this standpoint. In addition, the I/O device 120 can supply a voltage representing what is stored either in the form of a digital output (if digital information has been stored) or in the form of analog information (if analogue information has been stored).

Finally, it is evident that modifications and variations may be made to the method and to the device described herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a microelectromechanical device, comprising:
    oscillating a movable mass with respect to a body according to a degree of freedom, the movable mass being elastically coupled to the body;
    detecting a current oscillation frequency of the movable mass using a frequency detector; and
    providing energy to the movable mass by a forcing stage capacitively coupled to the movable mass, the energy being provided through forcing signals having a forcing frequency equal to the current oscillation frequency detected by the frequency detector in a start-up procedure of the microelectromechanical device.

2. The method of claim 1 further comprising detecting a current oscillation phase of the movable mass, wherein providing energy comprises providing the forcing signals with a constant phase delay with respect to the detected current oscillation phase.

3. The method of claim 2, wherein the constant phase delay is less than $\pi/2$.

4. The method of claim 3, wherein the constant phase delay is zero.

5. The method according to claim 1 further comprising maintaining the movable mass in oscillation at a driving frequency in a steady operating condition using a driving device coupled to the movable mass so as to form a microelectromechanical loop.

6. The method of claim 5, wherein detecting the current oscillation frequency of the movable mass comprises providing a main clock signal synchronous with oscillations of the microelectromechanical loop in the start-up procedure, and the forcing signals are generated on the basis of the main clock signal in the start-up procedure.

7. The method of claim 1, wherein detecting the current oscillation frequency of the movable mass comprises using a PLL circuit.

8. The method of claim 1 further comprising providing a reference clock signal, independent of oscillations of the movable mass; wherein providing energy to the movable mass through forcing signals comprises generating the forcing signals on the basis of the reference clock signal in a transient operating condition.

9. The method of claim 8, wherein the forcing signals include a maximum number of cycles in the transient operating condition, the maximum number of cycles selected so that a phase delay of the forcing signals with respect to oscillations of the movable mass does not exceed $\pi/2$.

10. The method of claim 1 further comprising terminating supply of the forcing signals based on a comparison between a current oscillation amplitude of the movable mass and a threshold oscillation amplitude.

11. The method of claim 1, wherein the forcing signals comprise sequences of square-wave pulses.

12. A method of controlling a microelectromechanical device, comprising:
    oscillating a movable mass with respect to a body according to a degree of freedom;
    detecting a current oscillation frequency of the movable mass; and
    providing energy to the movable mass through forcing signals having a forcing frequency equal to the detected current oscillation frequency in a first transient operating condition; and
    wherein detecting a current oscillation frequency of the movable mass includes,
        providing a main clock signal synchronous with oscillations of the microelectromechanical loop in the first transient operating condition; and
        generating the forcing signals on the basis of the main clock signal in the first transient operating condition.

13. The method of claim 12, comprising detecting a current oscillation phase of the movable mass, wherein providing energy comprises providing the forcing signals with a constant phase delay with respect to the detected current oscillation phase.

14. The method of claim 13, wherein the constant phase delay is less than $\pi/2$.

15. The method of claim 14, wherein the constant phase delay is zero.

16. The method of claim 12, comprising maintaining the microelectromechanical loop in oscillation at a driving frequency in a steady operating condition using a driving device coupled to the movable mass so as to form a microelectromechanical loop.

17. The method of claim 12 further comprising locking the forcing signals and oscillations of the microelectromechanical loop in the first transient operating condition.

18. A method of controlling a microelectromechanical device, comprising:
  oscillating a movable mass with respect to a body according to a degree of freedom;
  detecting a current oscillation frequency of the movable mass;
  providing energy to the movable mass through forcing signals having a forcing frequency equal to the detected current oscillation frequency in a first transient operating condition;
  providing a reference clock signal independent of oscillations of the movable mass; and
  generating the forcing signals on the basis of the reference clock signal in a second transient operating condition.

19. The method of claim 1, wherein the forcing signals include a maximum number of cycles in the second transient operating condition, the maximum number of cycles selected so that a phase delay of the forcing signals with respect to oscillations of the movable mass does not exceed $\pi/2$.

\* \* \* \* \*